US011878950B2

(12) United States Patent
Lemke et al.

(10) Patent No.: US 11,878,950 B2
(45) Date of Patent: Jan. 23, 2024

(54) OXYFUEL CLINKER PRODUCTION WITH SPECIAL OXYGEN ADDITION (71) Applicants: THYSSENKRUPP INDUSTRIAL SOLUTIONS AG, Essen (DE); VICAT SA, L'Isle-d'Abeau (FR); DYCKERHOFF GMBH, Wiesbaden (DE)

(72) Inventors: Jost Lemke, Ennigerloh (DE); Eike Willms, Dortmund (DE)

(73) Assignees: THYSSENKRUPP INDUSTRIAL SOLUTIONS AG, Essen (DE); VICAT SA, L'Isle-d'Abeau (FR)

(*) Notice: Subject to any disclaimer, the term of this patent is extended or adjusted under 35 U.S.C. 154(b) by 0 days.

(21) Appl. No.: 17/051,087

(22) PCT Filed: Apr. 26, 2019

(86) PCT No.: PCT/EP2019/060773
§ 371 (c)(1),
(2) Date: Oct. 27, 2020

(87) PCT Pub. No.: WO2019/211202
PCT Pub. Date: Nov. 7, 2019

(65) Prior Publication Data
US 2021/0198142 A1    Jul. 1, 2021

(30) Foreign Application Priority Data

Apr. 30, 2018  (DE) .................. 10 2018 206 673.6

(51) Int. Cl.
C04B 7/44    (2006.01)
C04B 7/43    (2006.01)
(Continued)

(52) U.S. Cl.
CPC ............ *C04B 7/4476* (2013.01); *C04B 7/432* (2013.01); *C04B 7/4407* (2013.01);
(Continued)

(58) Field of Classification Search
CPC .......... F27B 7/3205; F27B 7/38; F27B 7/362; F27B 7/383; F27B 7/36; F27B 7/2033; F27B 7/205; F27B 7/2058; C04B 7/4407
See application file for complete search history.

(56) References Cited

U.S. PATENT DOCUMENTS 3,162,431 A    12/1964 Muller
3,869,248 A    3/1975  Hirai et al.
(Continued)

FOREIGN PATENT DOCUMENTS

CN    102112833 A    6/2011
CN    104058606 A    9/2014
(Continued)

OTHER PUBLICATIONS

Dylan Moore, Exhaust gas handling, Apr. 28, 2018 https://www.cementkilns.co.uk/exhaust.html (Year: 2018).*
(Continued)

*Primary Examiner* — Edelmira Bosques
*Assistant Examiner* — Michael James Giordano
(74) *Attorney, Agent, or Firm* — thyssenkrupp North America, LLC (57) ABSTRACT

Processes and plants for producing cement clinker, in which an oxygen-containing gas having a proportion of 15% by volume or less of nitrogen and a proportion of 50% by volume or more of oxygen is conveyed from a first section of the cooler directly adjoining the top of the furnace into the rotary furnace and is optionally additionally conveyed to the calciner, and where the total gas streams fed in to the combustion processes consist to an extent of more than 50%

(Continued)

by volume (preferably more than 85% by volume) of oxygen.

18 Claims, 7 Drawing Sheets

(51) Int. Cl.
  *C04B 7/47* (2006.01)
  *F27B 7/36* (2006.01)
  *F27B 7/38* (2006.01)
  *F27B 7/32* (2006.01)
(52) U.S. Cl.
  CPC ............ *C04B 7/4415* (2013.01); *C04B 7/475* (2013.01); *F27B 7/3205* (2013.01); *F27B 7/36* (2013.01); *F27B 7/362* (2013.01); *F27B 7/383* (2013.01)

(56) References Cited

U.S. PATENT DOCUMENTS

| | | | |
|---|---|---|---|
| 4,568,276 A | 2/1986 | Fujisawa | |
| 4,913,742 A | 4/1990 | Kwech | |
| 6,309,210 B1 | 10/2001 | Marin | |
| 2004/0029064 A1* | 2/2004 | Skaarup Jensen | F27B 7/2033 432/14 |
| 2007/0234940 A1* | 10/2007 | Thomsen | C04B 7/4423 110/342 |
| 2008/0090194 A1 | 4/2008 | Laux et al. | |
| 2008/0245275 A1* | 10/2008 | Mohr | F27B 7/2033 106/739 |
| 2011/0061569 A1 | 3/2011 | DeVroe et al. | |
| 2011/0113987 A1* | 5/2011 | Jorget | C04B 7/43 422/198 |
| 2011/0113988 A1* | 5/2011 | Cordonnier | F27B 7/2033 106/771 |
| 2015/0183686 A1* | 7/2015 | Frie | C04B 7/006 106/638 |
| 2020/0392041 A1 | 12/2020 | Charmet et al. | |

FOREIGN PATENT DOCUMENTS

| | | | | |
|---|---|---|---|---|
| DE | 100 13 929 C | | 11/2002 | |
| DE | 102006026234 A1 | * | 12/2007 | ......... F27D 15/0213 |
| EP | 0534225 A1 | * | 3/1993 | ............. F27B 7/383 |
| EP | 1 037 005 B | | 4/2006 | |
| JP | S60172341 A | | 9/1985 | |
| JP | 2007098343 A | * | 4/2007 | |
| JP | 2007-126328 A | | 5/2007 | |
| JP | 2008214136 A | * | 9/2008 | ............... C04B 7/48 |
| JP | 2008239359 A | * | 10/2008 | ............. C04B 7/364 |
| WO | 8303601 A | | 10/1983 | |
| WO | 99/06778 A | | 2/1999 | |
| WO | WO-9906778 A1 | * | 2/1999 | ........... F27B 7/2025 |
| WO | WO-2008059378 A2 | * | 5/2008 | ............. C04B 7/367 |
| WO | 2009/156614 A1 | | 12/2009 | |
| WO | 2019/115967 A1 | | 6/2019 | |
| WO | WO-2019115967 A1 | * | 6/2019 | ............. C04B 7/475 |

OTHER PUBLICATIONS

English Translation of International Search Report issued in PCT/EP2019/060773, dated Jun. 14, 2019.

* cited by examiner

OXYFUEL CLINKER PRODUCTION WITH SPECIAL OXYGEN ADDITION

CROSS REFERENCE TO RELATED APPLICATIONS

This application is a U.S. National Stage Entry of International Patent Application Serial Number PCT/EP2019/060773, filed Apr. 26, 2019, which claims priority to German Patent Application No. DE 10 2018 206 673.6, filed Apr. 30, 2018, the entire contents of both of which are incorporated herein by reference.

FIELD

The present disclosure generally relates to processes and plants for producing cement clinker.

BACKGROUND

Processes and plants in which air is introduced into the clinker cooler and preheated, with part of this air being able to flow into the furnace, are known from the prior art. Furthermore, it is known that mixtures of $CO_2$ and $O_2$ instead of air can be supplied to the cooler.

Examples of prior art are EP 1 037 005 B1, JP 2007-126328 A or DE 100 13 929 C2. Further examples are WO 99/06778 A1 and U.S. Pat. No. 3,162,431 A.

Owing to steadily increasing requirements in terms of economics and ecology, there is still a need for improved plants and processes for producing cement clinker.

Thus a need exists for improved plants and processes for producing cement clinker, which do not have the disadvantages of the prior art and are improved in respect of economics and ecology compared to the plants and processes of the prior art.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to processes and plants for producing cement clinker, in which an oxygen-containing gas having a proportion of 15% by volume or less of nitrogen and a proportion of 50% by volume or more of oxygen is conveyed from a first section of the cooler directly adjoining the top of the furnace into the rotary furnace and is optionally additionally conveyed to the calciner.

The present invention provides, in one embodiment, a rotary furnace plant for producing cement clinker, which plant comprises an apparatus configured for feeding oxygen-containing gas which has a proportion of 15% by volume or less of nitrogen and a proportion of 50% by volume or more of oxygen from a first section of the cooler directly adjoining the top of the furnace into the rotary furnace and optionally additionally into the calciner, and where the plant is configured for feeding gas streams which in total consist to an extent of more than 50% by volume, preferably of more than 85% by volume, of oxygen into the combustion processes.

In a further embodiment, the present invention correspondingly provides a process for producing cement clinker, wherein an oxygen-containing gas having a proportion of 15% by volume or less of nitrogen and a proportion of 50% by volume or more of oxygen from a first section of the cooler directly adjoining the top of the furnace is conveyed into the rotary furnace and optionally additionally the calciner, where the total gas streams fed to the combustion processes consist to an extent of more than 50% by volume, preferably more than 85% by volume, of oxygen.

The plant of the invention or the process of the invention can thus be compared to a type of oxyfuel process.

Compared to concepts known hitherto, the plant of the present invention is also distinguished by the fact that, inter alio, no conventional $O_2/CO_2$ mixture is supplied as secondary gas at the top of the furnace, but instead a very pure oxygen gas is used. This would hitherto not have been explored in detail because of anticipated problems due to higher combustion temperatures in the rotary tube furnace and reduced gas volume flows (i.e. lower carrying capacity of the gas or gases for solid in the calciner and preheater region). However, these problems have been able to be overcome by a number of targeted modifications of the process and consequently lead to a significantly reduced construction height and a reduced space requirement of the plant combined with a higher $CO_2$ concentration in the exhaust gas.

In preferred embodiments of the present invention, the rotary furnace plant consists of a cyclone preheater, an in-line calciner without tertiary air conduit, a rotary furnace and a cooler. A conduit for intermediate air runs from the cooler to a middle cyclone stage in the preheater and subsequently to the raw mill.

In preferred embodiments of the present invention, the cyclone preheater consists of a multistage cyclone cascade which is operated using a significantly smaller amount of gas. The exhaust gas volume flow downstream of the preheater is from about 0.50 to 0.70 standard $m^3/kg$ of clinker. The ratio of amount applied to exhaust gas can accordingly be higher than hitherto possible and is, in one variant, from 1 to 2 kg/kg of solid to gas, preferably from 1.3 to 1.9 kg/kg of solid to gas. Parallel to the cyclone cascade, there is an additional cyclone stage which is supplied with hot air from the cooler. Based on the flow of meal, this additional stage is, in a preferred embodiment, located centrally within the cyclone cascade.

If the exhaust air from the cooler is to be utilized for purposes other than meal preheating, it is also possible for preheating to be effected only by means of exhaust gases from the calciner.

In further embodiments of the present invention, the preheater can be configured as fluidized-bed reactor, in particular in the form of a so-called bubble-forming fluidized bed.

Accordingly, in some embodiments of the present invention, the ratio of solid fed in to exhaust gas in the preheating step is set to greater than 1.0 kg, preferably greater than 1.3 kg, of solid per 1 kg of gas, preferably from 1 to 2 kg/kg of solid to gas, particularly preferably from 1.3 to 1.9 kg/kg of solid to gas, or the plant is appropriately configured for setting such a ratio (amount fed in to exhaust gas stream) in the preheater.

In various embodiments, the calciner corresponds substantially to the classical design, with the solid/gas ratio being significantly higher; there are local solids loadings of more than 2 kg per kg of gas, for example from 2 to 8 kg per kg of gas. The major part (more than 60%, for example about 80%, of the heat of the fuel is converted in the calciner. Despite an initial oxygen concentration of about 75%, the meal present provides a sufficient heat sink to prevent overheating. If coarse substitute fuel (having edge lengths of >100 mm) is to be burnt, an inclined region having a relatively high residence time for the fuel may have to be provided. Examples of such inclined regions are stair-type steps, push gratings, back-pushing gratings, etc.

Accordingly, in some embodiments of the present invention, the ratio of solid fed in to exhaust gas in the calcination step is set to greater than 1.0 kg, preferably greater than 1.3 kg, of solid per 1 kg of gas, preferably from 1 to 2 kg/kg of solid to gas, particularly preferably from 1.3 to 1.9 kg/kg of solid to gas, or the plant is configured appropriately for setting such a ratio in the calciner.

Since the plant is, for the purposes of the present invention, preferably operated without "tertiary air" or "tertiary gas" (i.e. a gas stream which bypasses the furnace and is connected to the calciner), it is possible to use, for example, a separate combustion chamber which is supplied with "tertiary air" or "tertiary gas" in a construction different from the conventional construction.

Possible alternatives in the context of the present invention are preferably flow of the furnace exhaust gas over the fuel in the inclined region of the calciner as variant integrated into their calciner or a shortened design which is attached to the one calciner without inclined surfaces.

According to the present invention, the rotary furnace is supplied with hot gas from the section of the cooler nearest the front. This is an oxygen-containing gas having a proportion of 15% by volume or less of nitrogen and a proportion of 50% by volume or more of oxygen.

In one variant of the present invention, the gas is very pure oxygen (more than 90%).

The rotary furnace burner conveys the fuel into the sintering zone, for which purpose recirculated $CO_2$ or a mixture of $CO_2$ and oxygen is used as transport gas for the fuel.

For the purposes of the present invention, the amount of fuel is selected so that the required nature of the sintering zone is achieved. For the production of cement clinker, a hot, first region of the furnace having a length of about ⅓ of the total length of the furnace is provided by the combustion, the function of which region is the formation of $C_3S$ (tricalcium silicate or alite) and at the hottest point of which material temperatures of more than 1450° C. are achieved. In order to ensure a sufficient extension of this hot region to the about first third of the furnace, the use of relatively coarse fuels compared to the prior art is conceivable in some embodiments, since very fast burning occurs in the hot oxygen atmosphere. At the same time or as an alternative, it is conceivable to reduce the primary gas amount and/or the blower-side pressure which is usually necessary in rotary furnace burners to form the flame. Both result in savings in electric energy consumption and smaller flow machines for increasing the pressure and accelerating the primary gas. The amount of fuel converted in the sintering zone is 20% or more of the total heat provided by the fuel. Since the entire amount of oxygen necessary for the combustion process is fed in to the rotary furnace, the oxygen excess in the sintering zone is about $\lambda=5$ (i.e. excess relative to the amount of oxygen necessary for the combustion).

However, it is equally possible in the context of the present invention to fire clinker having high $C_3S$ contents and low $C_2S$ (dicalcium silicate) contents. The clinker mineralogy is usually set via the raw meal mixture. Usual values for cement clinker containing 65% of $C_3S$, 13% of $C_2S$, etc., are a lime standard of 95, TM=2.3 (alumina modulus), SM=2.5 (silicate modulus). If a higher temperature is set in the sintering zone at the same residence time, it is possible to increase the lime standard. In this case, a higher $C_3S$ content is achieved in the product at the same free lime contents. $C_3S$-rich clinkers achieve better strength properties in the cement compared to clinkers which are lower in $C_3S$. Since the $C_2S$ component is more difficult to mill than the $C_3S$ component, the higher $C_3S$ content also results in a reduction in the electric energy consumption necessary for cement milling.

As an alternative, there is also the possibility of reducing the residence time of the material in the furnace. In variants, it is possible to shorten the furnace in respect of the residence time when cement clinker having the above-mentioned "standard values" is to be produced at relatively high temperatures. One preferred embodiment could be turning the furnace more quickly (e.g. at more than 5 rpm) and/or setting a smaller furnace inclination.

Owing to the greatly increased amount of oxygen available in the sintering zone, fast burning of even less well worked up fuels can be expected. These can be fuels which are coarser, moister or have a lower calorific value. If, for example, a solid fuel such as coal is used for the process of the invention, the fuel has to be milled less finely. This saves electric energy which otherwise has to be provided for milling of the fuel. However, the fuel can likewise have been dried to a lesser extent. This saves thermal energy which can be utilized elsewhere. The process of the invention and the plant of the invention are thus particularly advantageous for use of waste fractions, known as substitute fuels.

For the purposes of the present invention, the flame in the firing furnace can be cooled by, for example, the three following methods A), B) and C) or a combination thereof. This is particularly advantageous when the amount of fuel necessary for the combustion or the combustion conditions, in particular the highly enriched oxygen atmosphere, lead(s) to high flame temperatures.

A) Recirculation of part of the furnace exhaust gas to the furnace inlet, combined with targeted cooling of this gas. Cooling of the gas preferably occurs indirectly by means of a heat exchanger which can be preceded by a dust removal device, for example a separation cyclone. The quantity of heat removed by the indirect heat exchange can be integrated into a concept for waste heat utilization.

B) Recirculation of part of the furnace exhaust gas by means of a separate calcination train which is followed by a cyclone separator, combined with targeted cooling of this gas. Cooling of the gas preferably occurs directly in the separate calciner with separation cyclone, by part of the raw meal which has not been deacidified being able to be introduced into the gas stream and the gas temperature thereof being able to be set.

C) Introduction of clinker dust into the hot air fed in to the furnace. This in practical terms extends the flame, so that the hot regions of the furnace are moved in the direction of the middle of the furnace, and the furnace inlet region is also operated at a higher temperature. This leads overall to a reduction in the heat demand in the calciner region.

The cooler, or clinker cooler, can for the purposes of the present invention be divided in process engineering terms into at least three functionally different parts:

A first part into which the oxygen-containing gas is fed and in which the oxygen is preheated and fed to the rotary furnace. This part differs from the conventional cement production process and known oxyfuel processes in that, unlike the conventional cement production processes, no ambient air is introduced and, in contrast to the known oxyfuel processes, no premixing of recirculated preheater exhaust gas with oxygen occurs and as a result a smaller amount of gas is fed to the furnace. At the same time, however, heat is recovered from the hot furnace product and recirculated to the rotary furnace, with the gas stream being able to be significantly hotter compared to the other processes because of its smaller amount. In one variant of the present invention, an amount of oxygen sufficient for the combustion in the furnace and calciner is in particular fed in to this part.

A second part in which a separation between the hot gas stream fed to the rotary furnace and the gas stream conveyed past the furnace occurs. The separation can, for example, a) occur mechanically, e.g. via a crusher, optionally with preceding column of material, or a dividing wall which is positioned above the clinker bed and separates the gas spaces, or b) occur by means of a system consisting of two or more spatial separation devices, with an intermediate gas, which either acts as inert gas (in particular $CO_2$, Ar, $H_2O$) for the combustion process or acts as combustion gas ($O_2$), or a mixture of these gases, being supplied to the resulting intermediate space.

A third part in which the final cooling of the clinker is carried out using any desired medium. This can conventionally be air or an internally recirculated gas stream which is fed to the cooler with the objective of further heating, e.g. for downstream utilization in a system for utilization of waste heat.

In the present invention, a considerable excess of heat can arise due to the small amount of gas taken off from the cooler as combustion air, for example when using a cross-flow cooler. The clinker exiting from the region whose heat content is not utilized for the combustion can have temperatures of about 1000° C. The excess of heat can be produced by cooling of the clinker from about 1000° C. to about 100° C. This heat can be used for supplying heat to an intermediate preheating stage in the preheater and feeding the remaining heat to the raw mill. As an alternative, this heat can be used, at least partly, for generation of electric power.

In a classical steam circuit, it is possible to achieve significantly higher hot steam pressures compared to conventionally operated cement plants because the gas temperature level in the last superheater stage is up to 900° C., or in some variants even above this. Compared to the temperatures of about 350° C.-400° C. normally present downstream of preheater, this is significantly higher. This steam turbine can thus also achieve a higher efficiency. In addition, smaller heat losses occur in the generation of electric power because the heat exchangers utilized for offtake of heat can be arranged close to one another.

In order to predry the raw meal in the raw mill in such a way that only a comparatively low heating power has to be expended for drying in the preheater, the heat supply and to a lesser extent the temperature available are usually of interest. For this purpose, it is possible to utilize the cooler exhaust gas not used in waste heat utilization or else the gas stream exiting from waste heat utilization. This generally has a sufficiently high temperature and heat content in order to realize drying of the raw meal.

Ideally, and thus preferred, is positioning of the raw mill in the vicinity of the cooler in order to keep the gas paths for the gas network short. In the case of intermediate waste heat utilization, for example for generation of electric power, the mill is arranged downstream of the cooler.

In the oxyfuel process, pollutant circuits arise in a manner similar to the conventional process for the production of cement clinker. If there is an internal pollutant circuit between furnace and preheater, as similarly occurs for sulfur and chlorine in clinker production, a system which removes pollutants from the circuit at the interface between furnace and preheater or furnace and calciner is also necessary here. If a solid is taken off and subsequently treated further externally in order to reduce the pollutant level, there are no changes from the conventional clinker production process. If a gas stream is taken off because the chlorine circuit is high, this also contains a high proportion of oxygen. In conventional rotary furnaces, bypass gas amounts of 15%, based on the gas stream present in the furnace inlet, are taken off at present. Since the oxygen of the oxygen-containing gas in the case of the present invention has previously been produced, for example, by fractionation of air, i.e. a process having a high energy consumption, it is useful to feed this stream back into the calciner as combustion gas.

For this reason, the following flow regime is used for the bypass plant in embodiments of the present invention. The bypass stream is taken off from the furnace inlet, mixed with a cold return gas, subsequently cooled further to about 140° C. by means of a gas-gas heat exchanger and an evaporative cooling tower and subsequently subjected to dust removal, with the pollutants, predominantly alkalis, sulfur and chlorine, condensing on the filter dust and being precipitated with the latter. The remaining gas stream is divided and fed to a further cooler which is preferably indirect and optionally also cools to below the dew point, so that moisture present in the gas condenses out. This part is used to cool the hot bypass gas. The other part is, before it can be recirculated to the calciner, advantageously at least partially freed of moisture and subsequently heated in the gas-gas heat exchanger by means of the exhaust gas which has been cooled in the bypass cooler. The water used in the evaporative cooling tower is, after having been taken from the water store, preheated by means of an indirect heat exchanger in order to cool the water exiting from the injection cooler. The water exiting from the injection cooler is cooled further in an air cooler and subsequently partly fed to the water reservoir or recirculated to the injection cooler.

One embodiment of the present invention relates to a process for producing a hydraulic binder, preferably cement clinker, from at least one starting material, consisting of at least the steps of preheating of the starting material, calcination of the preheated starting material, firing of the calcined starting material with the objective of producing hydraulically active mineral phases, cooling of the hydraulic binder, characterized in that the total gas streams fed to the combustion processes consist to an extent of more than 50% by volume, preferably more than 85% by volume, of oxygen.

One embodiment of the present invention relates to a process for producing cement clinker and/or hydraulic clinker, which can be, for example, Portland clinker, consisting of a preheater, an (entrained flow) calciner, a rotary furnace and a cooler, characterized in that the gas fed from the cooler to the furnace plant (rotary furnace and calciner) consists to an extent of more than 50% by volume, preferably more than 85% by volume, of oxygen.

One embodiment of the present invention relates to a process for producing a hydraulic binder from at least one starting material, consisting of at least the steps of preheating of the starting material to calcination temperature, calcination of the preheated starting material, firing of the calcined starting material with the objective of producing hydraulically active mineral phases, cooling of the hydraulic binder, characterized in that the gas streams fed to the combustion processes comprise more than 50% by volume of oxygen and consist to an extent of less than 50% by volume of recirculated exhaust gas from a combustion process which is characterized by a nitrogen content of less than 8% by volume in the moist reference state.

One embodiment of the present invention relates to a process for producing hydraulic cement clinker from at least one starting material, consisting of at least the steps of preheating of the starting material, calcination of the preheated starting material, firing of the calcined starting material with the objective of producing hydraulically active mineral phases, cooling of the hydraulic binder, characterized in that the preheating occurs in a cyclone preheater in which the ratio of solid fed in to exhaust gas is from greater than 1 to 2 kg of solid per 1 kg of gas, preferably from 1.3 to 1.9 kg of solid per kg of gas.

One embodiment of the present invention relates to a plant for producing hydraulic cement clinker, consisting of at least one cyclone preheater, an entrained flow calciner, a rotary furnace and a clinker cooler, characterized in that the entrained flow calciner has a nonvertical section into which coarse fuels having an edge length of more than 100 mm (i.e. non-entrainable size) are introduced and hot gases flow over them in the calciner.

One embodiment of the present invention relates to a process for producing hydraulic cement clinker from at least one starting material, consisting of at least the steps of preheating of the starting material, calcination of the preheated starting material, firing of the calcined starting material with the objective of producing hydraulically active mineral phases, cooling of the hydraulic binder, characterized in that a gas substream from plant components located upstream in the flow direction of material (e.g. from the furnace inlet or downstream of the calciner) is recirculated to the top of the furnace/the combustion, i.e. the main burner.

One embodiment of the present invention relates to a process for producing hydraulic cement clinker from at least one starting material, consisting of at least the steps of preheating of the starting material, calcination of the preheated starting material, firing of the calcined starting material with the objective of producing hydraulically active mineral phases, cooling of the hydraulic binder, characterized in that a gas having a content of 85% by volume of oxygen is fed to a first section of the cooler.

One embodiment of the present invention relates to a process for producing hydraulic cement clinker from at least one starting material, consisting of at least the steps of drying and milling of the raw material, preheating of the starting material, calcination of the preheated starting material, firing of the calcined starting material with the objective of producing hydraulically active mineral phases, cooling of the hydraulic binder, characterized in that hot air from the clinker cooler is at least partly fed to preheating and subsequently drying and milling, with mixing with the exhaust gas from the calcination and firing process being avoided.

One embodiment of the present invention relates to a process for producing hydraulic cement clinker from at least one starting material, consisting of at least the steps of drying and milling of the raw material, preheating of the starting material, calcination of the preheated starting material, firing of the calcined starting material with the objective of producing hydraulically active mineral phases, cooling of the hydraulic binder, characterized in that the oxygen-rich gas taken from the furnace inlet region is, after being depleted in sulfur, chlorine and similar components, recirculated to the furnace system. In this embodiment, the oxygen which is usually produced in an expensive process is firstly collected and can be utilized further and, secondly, precipitation of the waste products chlorine and sulfur on dust is achieved.

In one embodiment of the present invention, the oxygen-containing gas is $N_2$-depleted air, in particular very greatly $N_2$-depleted air.

In one embodiment of the present invention, the oxygen-containing gas is air which is highly enriched in $O_2$.

In one embodiment of the present invention, the oxygen-containing gas is pure (technical-grade) oxygen.

In one embodiment of the present invention, the oxygen-containing gas is not an $O_2/CO_2$ mixture.

In one embodiment of the present invention, the gas stream fed in is not a recirculated gas.

In one embodiment of the present invention, the gas stream fed in does not contain any recirculated gas.

In one embodiment of the present invention, the oxygen-containing gas is not air or any treated or worked-up air. This is a preferred embodiment.

It has been taken into account that a small amount of air may possibly be sucked in from outside during operation of the plant under reduced pressure. A small amount in this case means less than 10% by volume, in particular from 1 to 5% by volume. This air which may have been sucked in from outside is not taken into account in the definition of the oxygen-containing gas.

In one embodiment of the present invention, only small proportions, preferably none, of the oxygen-containing gas leave the cooler as exhaust air.

In some embodiments of the present invention, the fuel energy introduced into the rotary furnace (secondary apparatus for binder sintering) amounts to less than 33% (⅓) of the fuel energy necessary for the process.

In some embodiments of the present invention, the quantity of heat introduced into the rotary furnace is less than 30% of the total quantity of heat introduced into the process, with the total heat energy corresponding to the sum of the heat energy introduced into the rotary furnace, the calciner, the exhaust gas path and the rotary furnace gases.

In some embodiments of the present invention, the total amount of exhaust gas produced by combustion and calcination for the binder (cement clinker) is less than <1 standard m³/kg of clinker. One standard m³ of gas corresponds to 1 m³ of gas at a pressure of 101.325 kPa at a temperature of 273.15 K.

In some embodiments of the present invention, the $CO_2$ concentration in the exhaust gas is above 85% or more.

In some embodiments of the present invention, the recirculation of exhaust gas is limited to less than 15%.

In the context of the present invention, it is possible to obtain $CO_2$ having a greatly increased purity downstream of the preheater, so that the further work-up is easier or is more advantageously possible compared to the previous prior art.

In the context of the present invention, it is possible to match the amounts of gas and fuel to one another so that, contrary to the expectations of the prior art, there are significantly fewer or even no problems caused by higher combustion temperatures and reduced gas volume flows.

The present invention also provides, inter alia, the following embodiments designated by Roman numerals:

I. Process for producing cement clinker, comprising the steps
   a) preheating of the starting material to calcination temperature,
   b) calcination of the preheated starting material,
   c) firing of the calcined starting material in a furnace,
   d) cooling of the cement clinker,
characterized by the step
   e) feeding of an oxygen-containing gas having a proportion of 15% by volume or less of nitrogen and a proportion of 50% by volume or more of oxygen from a first section of the cooler directly adjoining the top of the furnace into
      i) the rotary furnace and
      ii) optionally additionally the calciner.

Ia. Process for producing cement clinker, comprising the steps
   a) preheating of the starting material to calcination temperature,
   b) calcination of the preheated starting material,
   c) firing of the calcined starting material in a furnace,
   d) cooling of the cement clinker,
   e) feeding of an oxygen-containing gas having a proportion of 15% by volume or less of nitrogen and a proportion of 50% by volume or more of oxygen from a first section of the cooler directly adjoining the top of the furnace into
      i) the rotary furnace and
      ii) optionally additionally the calciner,
characterized in that the total gas streams fed to the combustion processes consist to an extent of more than 50% by volume, preferably more than 85% by volume, of oxygen.

II. Process according to embodiment I or Ia, characterized in that the ratio of solid fed in to exhaust gas in step a) is set to greater than 1.0 kg, preferably greater than 1.3 kg, of solid per 1 kg of gas, preferably from 1 to 2 kg/kg of solid to gas, particularly preferably from 1.3 to 1.9 kg/kg of solid to gas, where the preheater is preferably a cyclone preheater.

III. Process according to embodiment I, Ia or II, characterized in that the ratio of solid fed in to exhaust gas in step b) is set to greater than 1.0 kg, preferably greater than 1.3 kg, of solid per 1 kg of gas, preferably from 1 to 2 kg/kg of solid to gas, particularly preferably from 1.3 to 1.9 kg/kg of solid to gas, where the calciner is preferably an entrained flow calciner.

IV. Process according to any of embodiments I to III, characterized in that coarse fuels having an edge length of 70 mm or more, preferably 100 mm or more, are introduced into the calciner, which is preferably an entrained flow calciner having a nonvertical section, so that the hot gases flow over them in the calciner.

V. Process according to any of embodiments I to IV, characterized in that a gas substream from plant components located upstream in the flow direction of material, preferably from the furnace inlet or downstream of the calciner, is recirculated to the top of the furnace for combustion.

VI. Process according to any of embodiments I to V, characterized in that hot exhaust air from the clinker cooler is fed
   a) at least partly to preheating,
   or
   b) at least partly to drying and milling,
   or
   c) at least partly to preheating and subsequently to drying and milling,
with mixing with the exhaust gas from the calcination and firing process being avoided.

VII. Process according to any of embodiments I to VII, characterized in that the oxygen-rich gas taken off from the furnace inlet region is, after having been depleted in at least sulfur and chlorine, recirculated to the furnace system.

VIII. Process according to any of embodiments I to VII, characterized in that the gas
   i) contains 75% by volume or more of oxygen, preferably 85% by volume or more, 90% by volume or more, 95% by volume or more, 98% by volume or more or 99% by volume or more,
   or
   ii) contains 10% by volume or less of nitrogen, preferably 8% by volume or less, 6% by volume or less, 4% by volume or less, or has a nitrogen content below the detection limit,
   or
   iii) contains 75% by volume or more of oxygen, preferably 85% by volume or more, 90% by volume or more, 95% by volume or more, 98% by volume or more or 99% by volume or more, and contains 10% by volume or less of nitrogen, preferably 8% by volume or less, 6% by volume or less, 4% by volume or less, or has a nitrogen content below the detection limit.

IX. Process according to any of embodiments I to VIII, characterized in that the amounts of gas and fuel fed in are regulated as a function of combustion temperature and gas volume flows.

According to the invention, the process is characterized in that the introduction of the oxygen-containing gas is set such that there is an excess of oxygen at the main burner and residual amounts of the oxygen go to the calciner for combustion there.

XI. Process according to any of embodiments I to X, characterized in that the introduction of the oxygen-containing gas is carried out exclusively on the side of a gas separation device which is arranged in the cooler and directly adjoins the top of the furnace,
   where the gas separation device is
      i) a mechanical gas separation device, ii) a system based on supply of a barrier gas, or
iii) a combined system.

XII. Plant for producing cement clinker, comprising
a preheater,
a calciner,
a rotary furnace and
a clinker cooler,
characterized in that the plant has, at the section of the cooler directly adjoining the top of the furnace, a device for feeding gas from the cooler to
i) the rotary furnace and
ii) optionally additionally to the calciner,
where the gas fed in has a proportion of 15% by volume or less of nitrogen and a proportion of 50% by volume or more.

XIIa. Plant for producing cement clinker, comprising
a preheater,
a calciner,
a rotary furnace and
a clinker cooler,
wherein the plant has, at the section of the cooler directly adjoining the top of the furnace, a device for feeding gas from the cooler to
i) the rotary furnace and
ii) optionally additionally the calciner,
which device is configured for feeding in a gas having a proportion of 15% by volume or less of nitrogen and a proportion of 50% by volume or more of oxygen, and
wherein the plant is configured for feeding gas streams which in total consist to an extent of more than 50% by volume, preferably more than 85% by volume, of oxygen to the combustion processes.

The advantages of the present invention arise, inter alio, from the following aspects: since furnace and preheater are always designed according to the amount of gas, the advantage of the omission of nitrogen from the mixture is that new plants can be made significantly smaller and are therefore considerably cheaper, or existing plants can be operated with a significantly higher capacity after conversion.

The various configurations, embodiments and variants of the present invention, for example, but not restricted thereto, of the various claims, can be combined with one another in any desired way, as long as such combinations are not contradictory.

The present invention can also be combined with the specific subject matter of the parallel invention "Oxyfuel clinker production without recirculation of the preheater exhaust gases", in particular the following embodiments designated by the Roman numerals CI to CXII, where these combinations are expressly also subject matter of the present invention:

Embodiment CI. Process for producing cement clinker, comprising the steps
a) preheating of the starting material to calcination temperature,
b) calcination of the preheated starting material,
c) firing of the calcined starting material in a rotary furnace,
d) cooling of the cement clinker,
e) introduction of an oxygen-containing gas having a proportion of 15% by volume or less of nitrogen and a proportion of 50% by volume or more of oxygen, into
i) the calciner,
characterized in that
no gases from the rotary furnace are fed to the calcination,
one-train or multitrain cyclone preheaters whose individual cyclones are connected to one another in a cascade-like manner are used for preheating,
material transfer and/or gas transfer is possible between the individual cyclone preheaters and
no recirculation of the preheater exhaust gases occurs.

Embodiment CIa. Process for producing cement clinker, comprising the steps
a) preheating of the starting material to calcination temperature,
b) calcination of the preheated starting material,
c) firing of the calcined starting material in a rotary furnace,
d) cooling of the cement clinker,
e) introduction of an oxygen-containing gas having a proportion of 15% by volume or less of nitrogen and a proportion of 50% by volume or more of oxygen, into
i) the calciner,
characterized in that
no gases from the rotary furnace are fed to the calcination,
one-train or multitrain cyclone preheaters whose individual cyclones are connected to one another in a cascade-like manner are used for preheating,
material transfer and/or gas transfer is possible between the individual cyclone preheaters and
no recirculation of the preheater exhaust gases occurs, and
characterized in that the ratio of solid fed in to exhaust gas in step a) is set to greater than 1.0 kg of solid to gas.

Embodiment CII. Process according to embodiment CI or CIa, characterized in that multistage one-train or multitrain cyclone preheaters are used.

Embodiment CIII. Process according to any of embodiments CI, CIa or CII, characterized in that two-train cyclone preheaters having from two to six stages, preferably five stages are used.

Embodiment CIV. Process according to any of embodiments CI to CIII, characterized in that crossing of meal streams but no crossing of the gas streams occurs after each stage between the preheaters of a multitrain cyclone preheater.

Embodiment CV. Process according to any of embodiments CI to CIV, characterized in that preheating occurs with involvement of at least one carbonator.

Embodiment CVI. Process according to any of embodiments CI to CV, characterized in that a preheater having a carbonator of a second preheater train is supplied with exhaust gases coming from the rotary furnace, where the exhaust gases have a small proportion of $CO_2$ of less than 35% in the dry reference state.

Embodiment CVII. Process according to any of embodiments CV to CVI, characterized in that the carbonatization temperature is set by means of a carbonator with cooler.

Embodiment CVIII. Process according to any of embodiments CI to CVII, characterized in that the temperature in the calciner or the amount of gas in the calciner or the temperature and the amount of gas in the calciner is regulated by means of partial recirculation of gases, where the recirculated gases are exhaust gases from one of the preheater stages following the calciner, preferably the first preheater stage following the calciner.

Embodiment CIX. Process according to embodiment CVIII, characterized in that the feeding of the recirculated gases occurs after the first separation cyclone or between the first and penultimate separation cyclones or after a plurality of separation cyclones.

Embodiment CX. Process according to any of embodiments CI to CVII, characterized in that the amounts of oxygen-containing gas and fuel fed in to the calciner are regulated as a function of calcination temperature and temperature in the preheater.

Embodiment CXI. Process according to any of embodiments CI to CX, characterized in that recirculation of the calciner exhaust gases additionally occurs.

Embodiment CXII. Plant for producing cement clinker, comprising a preheater, a calciner, a rotary furnace and a clinker cooler, where the plant has a device for feeding gas to i) the calciner, where the gas fed in has a proportion of 15% by volume or less of nitrogen and a proportion of 50% by volume or more of oxygen, characterized in that no air from the rotary furnace is fed in to the calciner, cyclone preheaters whose individual cyclones are connected to one another in a cascade-like manner are used as preheaters and material transfer and/or gas transfer is possible between the individual cyclone preheaters and there is no recirculation device for the preheater exhaust gases.

Embodiment CXIIa. Plant for producing cement clinker comprising a preheater, a calciner, a rotary furnace and a clinker cooler, where the plant has a device for feeding gas to i) the calciner, where the gas fed in has a proportion of 15% by volume or less of nitrogen and a proportion of 50% by volume or more of oxygen, characterized in that no air from the rotary furnace is fed in to the calciner, cyclone preheaters whose individual cyclones are connected to one another in a cascade-like manner are used as preheaters and material transfer and/or gas transfer is possible between the individual cyclone preheaters and there is no recirculation device for the preheater exhaust gases, and characterized in that the plant is configured for setting the ratio of solid fed in to exhaust gas in the preheater to greater than 1.0 kg of solid to gas.

Figure 4A:
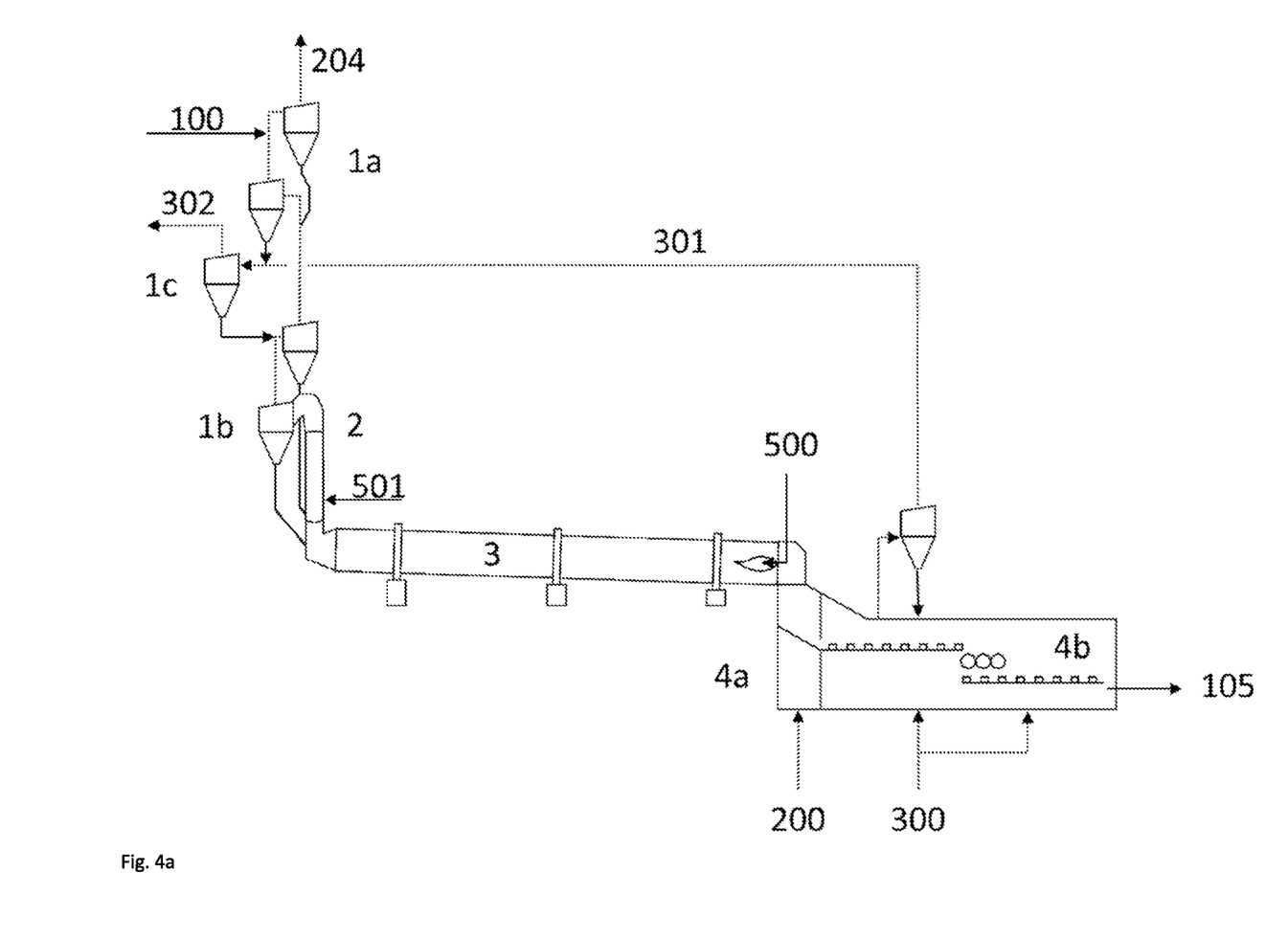
FIG. 4a is a diagram of a plant for clinker production, in which the involvement of the cooler exhaust air in preheating is depicted.
Figure 4B:
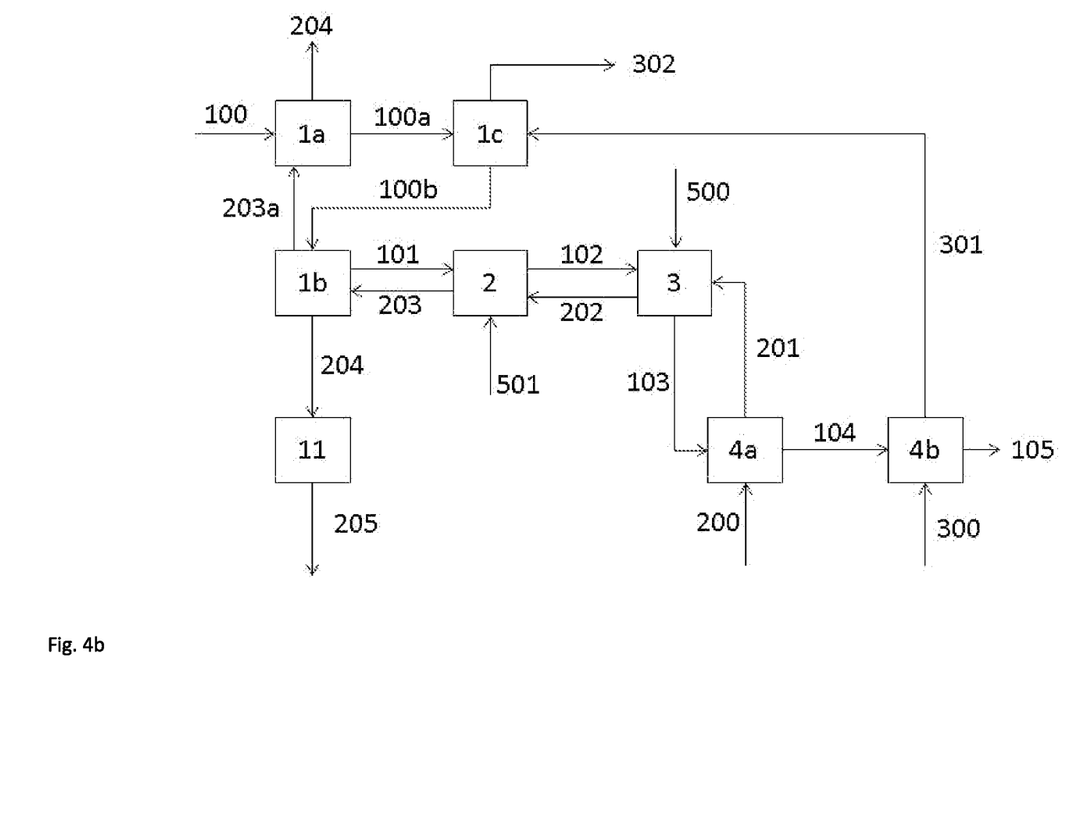
FIG. 4b is a flow chart of a plant for clinker production, in which the involvement of the cooler exhaust air in preheating is depicted.
Figure 5A:
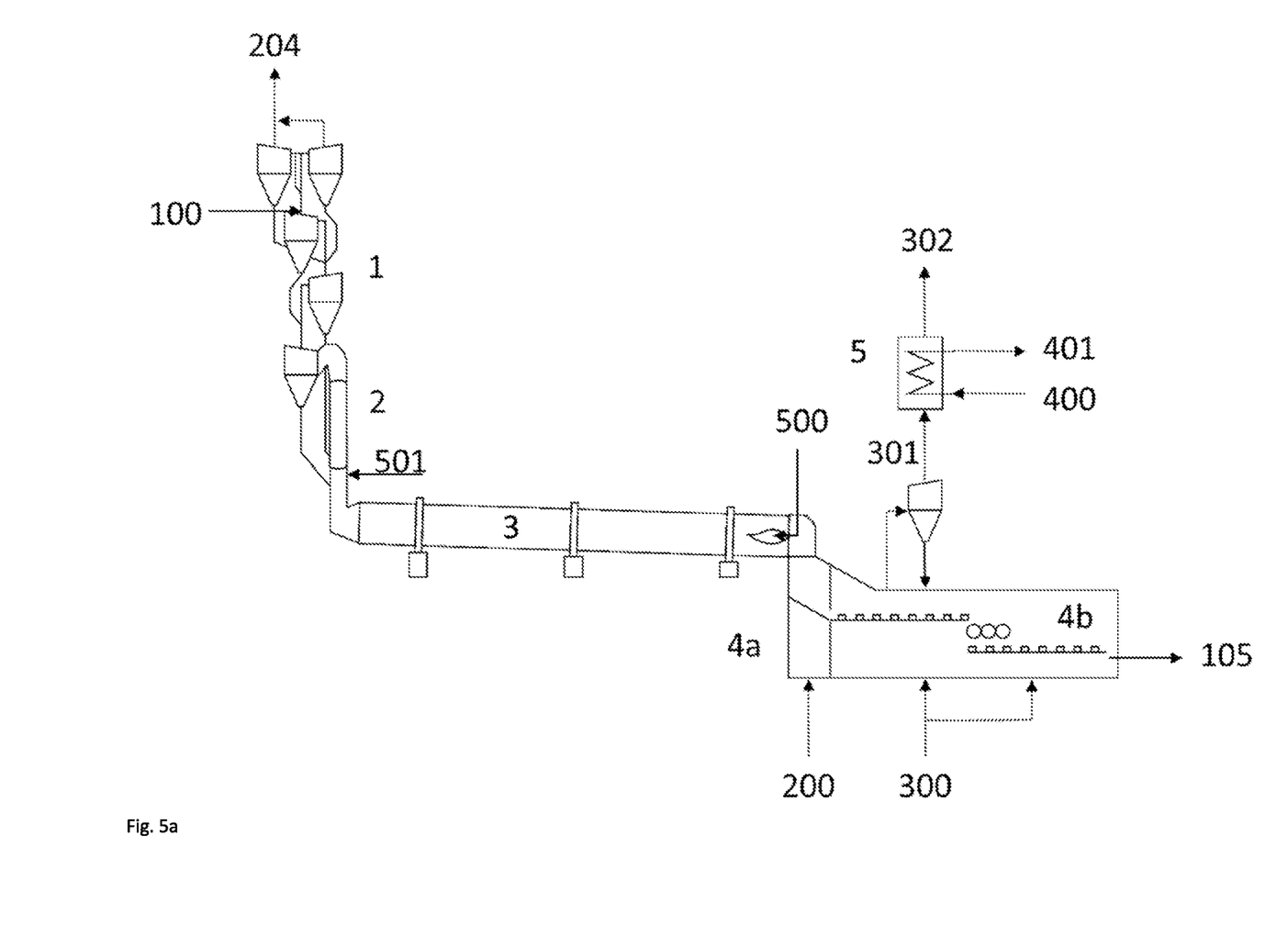
FIG. 5a is a diagram of a similar embodiment to that in FIG. 4a/b, but the waste heat is utilized differently from what is shown in FIG. 4a/b.
Figure 5B:
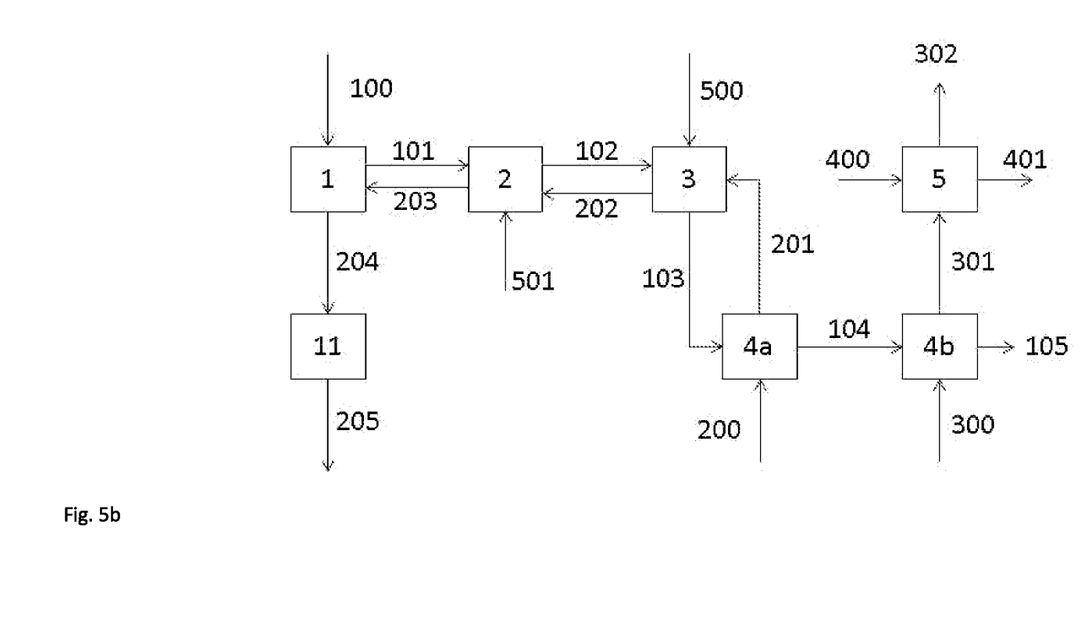
FIG. 5b is a flow chart of a similar embodiment to that in FIG. 4a/b, but the waste heat is utilized differently from what is shown in FIG. 4a/b.

In FIGS. 4 and 5, transitions of solid are depicted as solid arrows and transitions of gaseous materials are depicted as dotted arrows.

Figure 1:
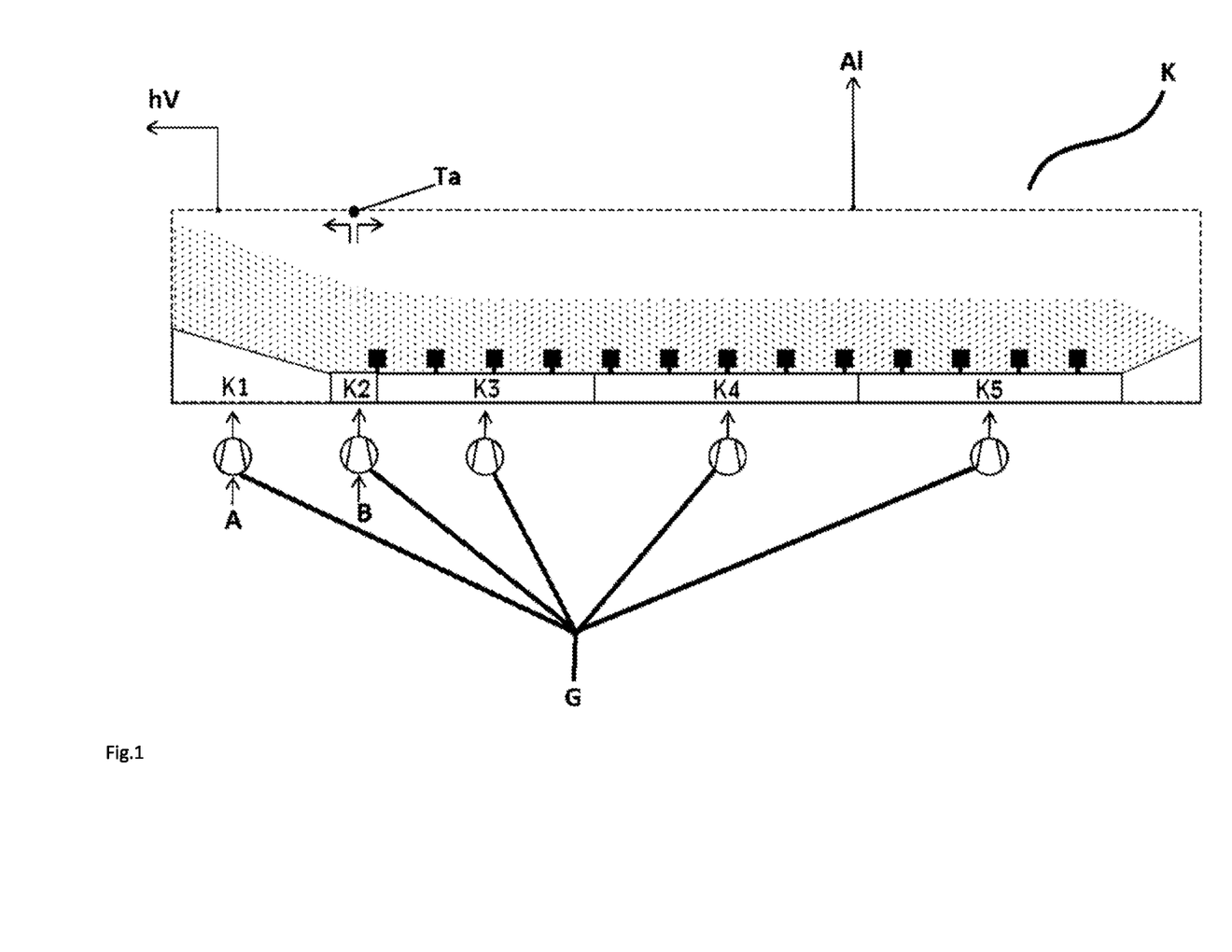
FIG. 1 is an apparatus of a cooler (clinker cooler) K which is divided into five different cooling zones K1 to K5.

FIG. 1 illustratively depicts a cooler (clinker cooler) K which is divided into five different cooling zones K1 to K5. Here, gas is fed in appropriately via the various blowers G. Cooling air for the clinker but no combustion air to the furnace is fed in via the blowers G assigned to the zones K3 to K5. The oxygen-containing gas A, which is conveyed as combustion air into the furnace, is fed in via the blower assigned to the zone K1. Barrier gas B is fed in via the blower assigned to the zone K2. This barrier gas can, for example, consist to an extent of 85% by volume or more of carbon dioxide, with the balance being inert gas, or, for example, consist to an extent of 85% by volume or more of oxygen with the balance being in inert gas. For the present purposes, the term inert gas preferably refers to components such as water vapor, argon, etc. In both cases, the gas B serves as barrier gas for sealing the oxygen region from the air region of the cooler. Furthermore, a $CO_2$ divider Ta which functions as a result of supply of the barrier gas is depicted in FIG. 1.

Figure 2:
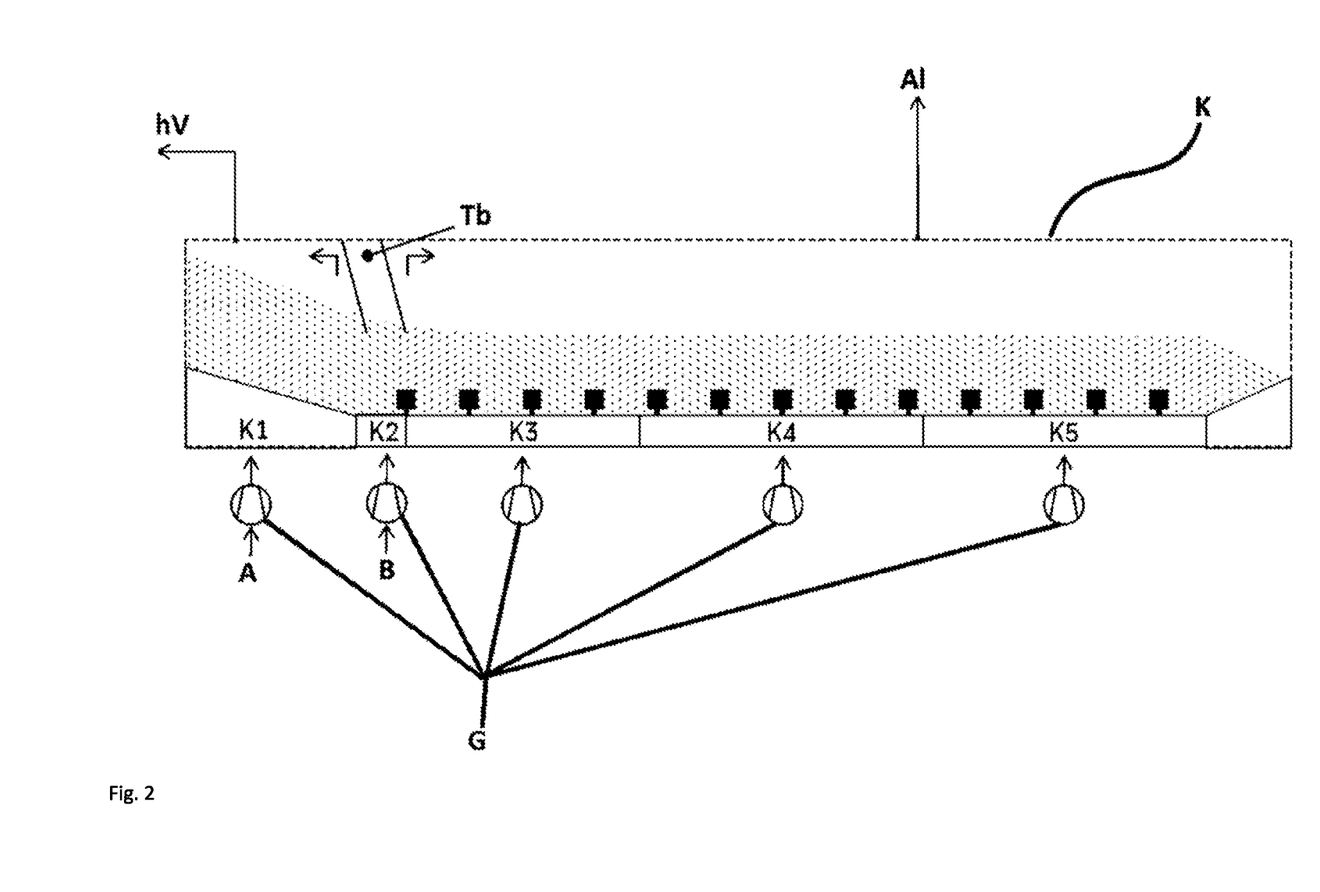
FIG. 2 is an apparatus of a cooler (clinker cooler) K mostly as shown in FIG. 1.

FIG. 2 illustratively depicts a cooler (clinker cooler) K mostly as shown in FIG. 1. The only difference from FIG. 1 is that the $CO_2$ divider Tb is configured as mechanical divider at which the separation of oxygen-containing gas is effected by means of supply of barrier gas and mechanical means, for example pendulum-like dividing walls resting movably on the bed. Although not shown in FIG. 2, the zone K2 can optionally be omitted when the mechanical $CO_2$ divider is sufficiently effective.

Figure 3:
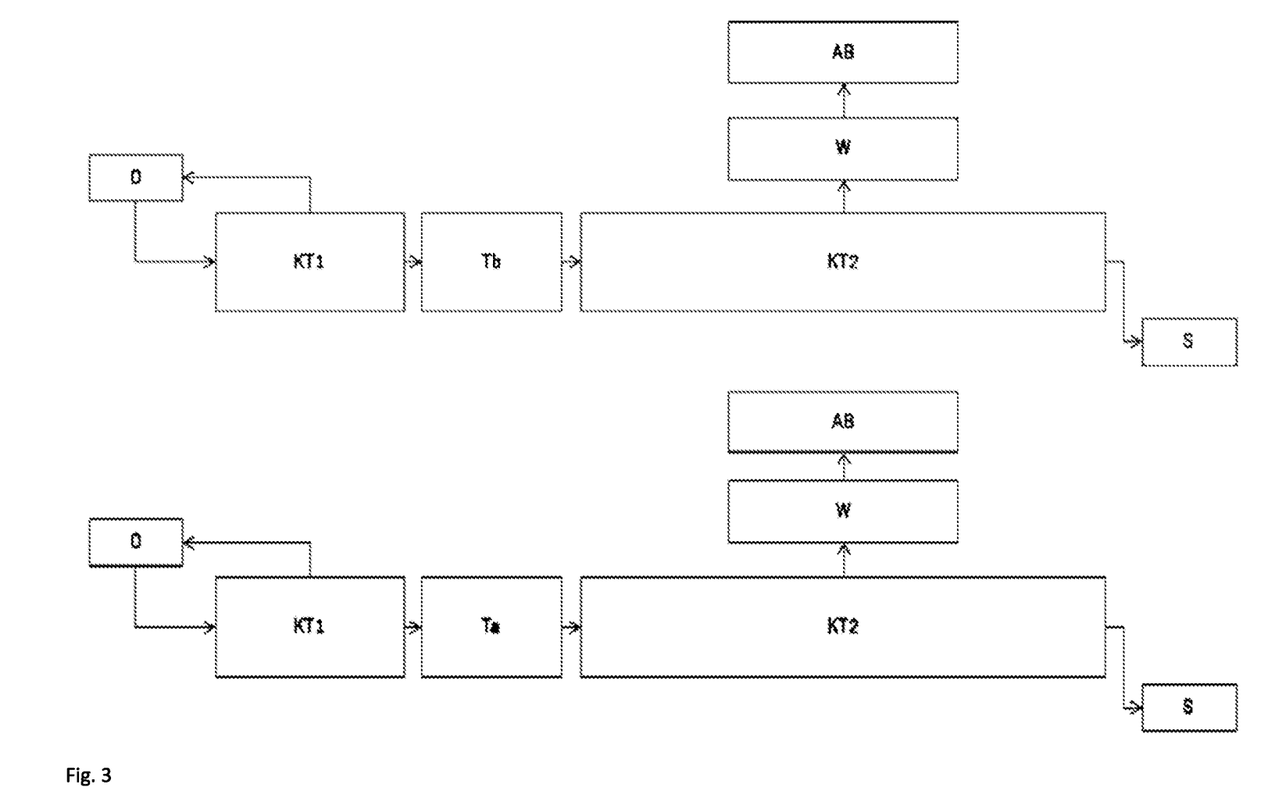
FIG. 3 are two flow diagrams which illustrate two possible variants of the present invention.

FIG. 3 shows two flow diagrams which illustrate two possible variants of the present invention, in which hot clinker from the furnace enters cooler part 1 and at the same time oxygen-containing gas is conveyed from the cooler part 1 into the furnace (recuperation of combustion gas to the furnace). A gas separation device is arranged adjoining the cooler part 1, and this device in turn adjoins cooler part 2. At the cooler part 2, the clinker then leaves the plant and is brought to the silo. In the upper part of the figure, a mechanical gas separation device 2b between cooler part 1 (corresponding to cooling zone K1) and cooler part 2 (corresponding to cooling zones K3 to K5) is depicted, while a gas separation device 2a based on barrier gas is shown in the lower part. In connection with cooler part 2, heat recovery for purposes other than use for combustion occurs in both variants, with heat carriers being combustion air, $CO_2$, etc. The cooler part 2 in both cases firstly adjoins a heat exchanger system which can be based on direct heat exchange or on indirect heat exchange. Subsequently, a waste gas treatment, which can encompass dust removal and/or a stack, is depicted for both variants.

FIG. 4 shows a plant for clinker production, in which the involvement of the cooler exhaust air in preheating is depicted. The cooler is, in comparison with FIGS. 1 and 2, depicted in simplified form in that only one blower is depicted to the left for the introduction of oxygen-containing gas according to the present invention, and the other four blowers are shown for the introduction of air. In the embodiment depicted in this figure, the cooler exhaust air is conveyed via a cyclone separator for removing solid particles into the preheater.

FIG. 5 describes a similar embodiment to that in FIG. 4, but the waste heat is utilized differently from what is shown in FIG. 4. Here too, the cooler exhaust air is conveyed through a cyclone separator but then not into the preheater stage but instead is conveyed through a heat exchanger and then into the raw milling plant for drying the raw meal.

LIST OF REFERENCE SYMBOLS

K Cooler (clinker cooler)
Ta Gas separation device with barrier gas ($CO_2$ divider (barrier gas))
Tb Mechanical gas separation device or mechanical gas separation device in combination with barrier gas ($CO_2$ divider (mechanical or mechanical/barrier gas combination))
G Blower
K1 Cooling zone 1 (first cooling zone)
K2 Cooling zone 2 (second cooling zone)
K3 Cooling zone 3 (third cooling zone)
K4 Cooling zone 3 (fourth cooling zone)
K5 Cooling zone 5 (fifth cooling zone)
A Oxygen-containing gas
B Barrier gas
hV Hot combustion air
Al Exhaust air
O Furnace
KT1 Cooler, part 1
KT2 Cooler, part 2
AB Exhaust gas treatment
W Heat exchanger system
S Silo
1 Preheater
1a Preheater (upper section)
1b Preheater (lower section)
1c Preheating cyclone supplied with cooler exhaust air
2 Calciner
3 Rotary furnace
4a Cooler using oxygen as cooling medium
4b Cooler using air as cooling medium
5 Air-air heat exchanger
100 Raw material 100a,b Hot meal
101 Hot meal to calciner
102 Hot meal to rotary furnace
103 Hot clinker
104 Hot clinker (about 1000° C.)
105 Cold clinker
200 Oxygen (>85%)
201 Secondary gas
202 Furnace exhaust gas
203 Calciner exhaust gas
203a Exhaust gas from lower preheater section
204 Preheater exhaust gas
300 Cooler feed air
301 Cooler exhaust air
302 Cooler exhaust air to raw mill
400 Air to heat exchanger
401 Heated air to raw mil
500 Fuel for main firing
501 Fuel for calciner

What is claimed is:

1. A method for producing cement clinker, comprising:
preheating a starting material to a calcination temperature,
performing calcination of the preheated starting material in a calciner,
firing, in a rotary furnace, the calcined starting material to form cement clinker,
cooling the cement clinker in a cooler, and
feeding an oxygen-containing gas having a proportion of 15% by volume or less of nitrogen and a proportion of 50% by volume or more of oxygen into a first section of the cooler, the first section of the cooler directly adjoining a top portion of the rotary furnace, and from the first section of the cooler into the rotary furnace,
wherein the total gas streams fed to the cooler consist of more than 75% by volume of oxygen,
the introduction of the oxygen-containing gas is set so that there is an excess of oxygen at a main burner and residual amounts of the oxygen-containing gas are permitted to enter the calciner for combustion, and a proportion of oxygen in the oxygen-containing gas fed from the cooler into the rotary furnace is the same as the proportion of oxygen in the oxygen-containing gas fed to the cooler.

2. The method of claim 1 wherein said feeding further comprises feeding of the oxygen-containing gas into the rotary furnace.

3. The method of claim 1 wherein the exhaust gas is supplied to said preheating of starting material step at a ratio wherein the starting material is greater than 1.0 kg of starting material per 1 kg of gas and wherein at least one cyclone preheater is used for preheating.

4. The method of claim 3 wherein the ratio of starting material fed in to the exhaust gas in said performing step is greater than 1.0 kg of starting material per 1 kg of exhaust gas, wherein the calciner is an entrained flow calciner.

5. The method of claim 1 wherein coarse fuels having an edge length of 70 mm or more are introduced into the calciner, which includes a nonvertical section, so that hot gases flow over the coarse fuels in the calciner.

6. The method of claim 1 wherein hot exhaust air directly from the clinker cooler is fed at least partly to said preheating step while avoiding mixing with the exhaust gas from the calcination and firing steps.

7. The method of claim 1 wherein the oxygen-containing gas that is fed from the cooler to the rotary furnace and the calciner contains one or both of 75% by volume or more of oxygen or contains 10% by volume or less of nitrogen.

8. The method of claim 1 wherein the amounts of the oxygen-containing gas and a fuel fed in are regulated as a function of combustion temperature and gas volume flows.

9. The method of claim 1 wherein introduction of the oxygen-containing gas is carried out exclusively on a side of a gas separation device that is arranged in the cooler and directly adjoins a top of the furnace, wherein the gas separation device is one or both of a mechanical gas separation device or a system based on supply of a barrier gas.

10. A plant for producing cement clinker, comprising:
a preheater,
a calciner,
a rotary furnace, and
a clinker cooler,
wherein the plant has, at a section of the cooler directly adjoining a top of the rotary furnace, a device for feeding gas from the cooler to the rotary furnace, the device configured to feed a gas having a proportion of 15% by volume or less of nitrogen and a proportion of 50% by volume or more of oxygen such that there is an excess of oxygen at a main burner and residual amounts of oxygen are conveyed into the calciner,
wherein the plant is configured for feeding gas streams which in total consist to an extent of more than 75% by volume of oxygen to the cooler,
wherein at least one of:
the plant is free of a tertiary air supply to the calciner, or
the plant is free of means separate from the rotary furnace for supplying enriched oxygen to the calciner.

11. The plant of claim 10 further comprising a device for feeding the gas into the calciner.

12. A method for producing cement clinker, comprising:
preheating a starting material to a calcination temperature;
performing calcination of the preheated starting material in a calciner;
firing, in a rotary furnace, the calcined starting material to form cement clinker;
cooling the cement clinker in a cooler;
feeding an oxygen-containing gas having a proportion of 15% by volume or less of nitrogen and a proportion of 50% by volume or more of oxygen into a first section of the cooler, the first section of the cooler directly adjoining a top portion of the rotary furnace, and from the first section of the cooler into the rotary furnace; and
limiting fuel energy that is introduced into the rotary furnace to less than 33% of fuel energy necessary for clinkering,
wherein the total gas streams fed to the cooler consist of more than 75% by volume of oxygen,
the introduction of the oxygen-containing gas is set so that there is an excess of oxygen at a main burner, so that residual amounts of the oxygen-containing gas are permitted to enter the calciner for combustion, and a proportion of oxygen in the oxygen-containing gas fed from the cooler into the rotary furnace is the same as the proportion of oxygen in the oxygen-containing gas fed to the cooler.

13. The method of claim 12 wherein the oxygen-containing gas that is fed from the cooler to the rotary furnace and the calciner is at least 50% by volume oxygen.

14. The method of claim 12 wherein introduction of the oxygen-containing gas is carried out exclusively on a side of a gas separation device that is arranged in the cooler and directly adjoins a top of the furnace, wherein the gas separation device is one or both of a mechanical gas separation device or a system based on supply of a barrier gas.

15. The method of claim 12 comprising at least one of:
    operating the calciner without a tertiary air supply, or
    operating the calciner without a supply of enriched oxygen that is separate from the rotary furnace.

16. The method of claim 1 wherein exhaust gas that leaves the calciner has a $CO_2$ concentration in a dry reference state of at least 85%.

17. The method of claim 1 comprising limiting fuel energy that is introduced into the rotary furnace to less than 33% of fuel energy necessary for clinkering.

18. The method of claim 1 wherein the calciner receives oxygen for combustion exclusively from the rotary furnace.

* * * * *

UNITED STATES PATENT AND TRADEMARK OFFICE
CERTIFICATE OF CORRECTION

PATENT NO. : 11,878,950 B2
APPLICATION NO. : 17/051087
DATED : January 23, 2024
INVENTOR(S) : Jost Lemke and Eike Willms It is certified that error appears in the above-identified patent and that said Letters Patent is hereby corrected as shown below:

On the Title Page

In item (73) "Assignees" should appear as:
(73) Assignees: THYSSENKRUPP INDUSTRIAL SOLUTIONS AG, Essen (DE); VICAT SA, L'Isle d'Abeau (FR); DYCKERHOFF GMBH, Wiesbaden (DE)

Signed and Sealed this
Eleventh Day of February, 2025

Coke Morgan Stewart
*Acting Director of the United States Patent and Trademark Office*